June 26, 1934.  L. W. SCOTT  1,964,678
CONTROLLING MEANS FOR BOILERS
Filed May 9, 1933
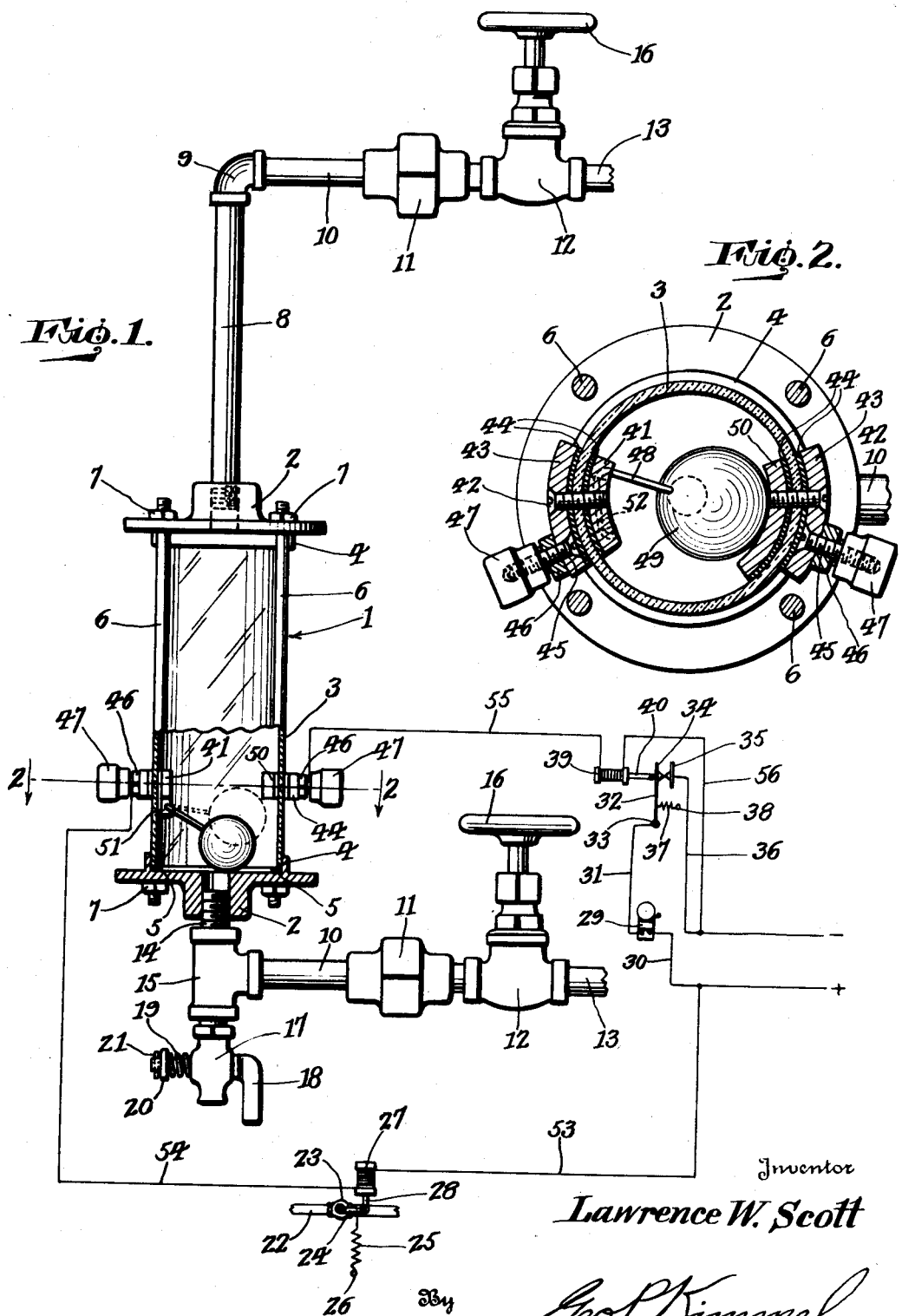
Inventor
Lawrence W. Scott
By Geo. P. Kimmel
Attorney Patented June 26, 1934

1,964,678

UNITED STATES PATENT OFFICE 1,964,678

CONTROLLING MEANS FOR BOILERS

Lawrence W. Scott, Wyoming, Pa., assignor of one-half to Daniel G. Robinhold, Forty Fort, Pa.

Application May 9, 1933, Serial No. 670,205

3 Claims. (Cl. 122—504)

This invention relates in general to a controlling means for boilers or the like, and more particularly has reference to a means for controlling a supply of fuel to the boiler in accordance with the level of the water or other liquid within the boiler.

In the past, means have been developed for causing an alarm to sound when the liquid level in a boiler falls dangerously low, and for this purpose fluid controlled switches have been placed within the liquid level indicator of the boiler. If, however, no one happened to be near to hear the alarm when it was sounded or if it were neglected for an undue length of time, a dangerous condition would result and might prove disastrous. Likewise, if the current supply should for some reason be interrupted, then the liquid level might fall dangerously low and no alarm would be sounded nor would anyone be warned of the dangerous condition. There would be nothing to prevent the supply of fuel from being continued and the inevitable would obviously follow.

Furthermore, in placing these fluid controlled switches within the liquid level indicators previously used, it has been necessary that the electrodes from the switches be extended out at the end of the liquid level indicator chamber and that considerable pains be taken to properly insulate the electrodes from each other and from the surrounding parts in order to prevent a short circuit. It has been a frequent experience that such mechanisms have been so complicated and have consisted of so many parts that they were either too expensive to be of practical use, or else that they were too unreliable to attain the safety for which they were intended.

It is therefore an object of this invention to provide a controlling means for a boiler by which the flow of fuel to the boiler will be automatically cut off in the event that the liquid level within the boiler falls below a certain predetermined point. It is an object of this invention that this result shall follow if for any reason the current supply shall either be temporarily or permanently interrupted, thus guarding against the possibility of a failure of current allowing a dangerous condition to exist without either a warning or a cutting off of the fuel supply to the boiler.

It is a further object of this invention to provide a device of the type described with an alarm which shall be sounded simultaneously with the cutting off of the fuel supply of the boiler.

It is furthermore an object of this invention to provide a float controlled switch for the liquid level indicator, which switch shall be mounted directly upon the transparent insulating walls of the liquid level indicator, and shall not require the customary insulation and care to prevent short circuits. This switch is to be simply constructed of a minimum number of parts thus making it inexpensive to manufacture, and at the same time it is to be positive and sure in its operation.

Other objects and advantages of this invention will become apparent from the following description taken in connection with the accompanying drawing, it being distinctly understood that the same are by way of illustration and example only and are not to be taken as in any way limiting the spirit or scope of this invention. The spirit and scope of this invention is to be limited only by the prior art taken in connection with the accompanying claims.

Referring now more particularly to the drawing in which like numerals indicate corresponding parts throughout:

Figure 1 is a view illustrating a liquid level indicator and float controlled switch mechanism constructed in accordance with this invention, together with a diagrammatic illustration of a fuel control and a low liquid level alarm arranged in accordance with this invention.

Figure 2 is a sectional view taken along the line 2—2 of Figure 1.

In accordance with this invention, there is provided a liquid level indicator generally designated at 1 and consisting of a pair of end members 2 preferably of metal or similar suitable material and having a cylindrical glass member interposed therebetween and forming the transparent walls of the indicator chamber. For the purpose of receiving the ends of the cylindrical glass member 3, the ends 2 are provided with circular flanges 4 of such a size as to just receive the ends of the cylindrical member 3 and snugly engage them. In order to provide a liquid tight seal between the ends of the cylindrical member 3 and the end members 2, a gasket 5 of any suitable material is positioned within the circle of each of the flanges 4 so as to receive the ends of the cylindrical member 3. The two end members 2 are held together and clamped against the ends of the cylindrical member 3 by means of a plurality of rods 6 extending between these end members outside of the cylindrical member 3 and having their opposite ends threaded for the purpose of receiving nuts 7.

The upper end member 2 is provided with an opening for the purpose of threadedly receiving the lower end of a pipe 8, which is in turn connected through the elbow 9, the pipe 10, the union 11, the valve 12 and the pipe 13 to the interior of the boiler at a point somewhat above the normal liquid level within the boiler.

The lower end member 2 is connected by means of a nipple 14, a T-coupling 15, a short length of pipe 10, a union 11, a valve 12 and a pipe 13 to the interior of the boiler somewhat below the normal liquid level.

The valves 12 may be operated by means of the hand wheels 16 to shut off the connection between the liquid level indicator and the boiler proper for the purpose of repairs or for any other reason which might arise. At the lower end of the T-coupling 15 there is provided a petcock 17 controlled by a handle 18. As is customary in such structures, the valve construction which is secured to the handle 18 is held in place by means of a spring 19 bearing against the washer 20, the washer 20 being in turn prevented from displacement by means of a pin 21. This petcock 17 permits of the ready drainage of the liquid level indicator for the purpose of making repairs or for any other reason.

With reference to the lower part of Figure 1, there is shown a portion of a pipe line 22 for the purpose of conveying fuel to the boiler. The flow of fuel through this pipe line is controlled by means of the valve 23 which is inserted in the pipe line and is adapted to be operated through the medium of the handle or lever 24. This lever 24 is normally urged toward closed position by means of a spring 25 secured to the lever at one end and anchored at its other end 26. The valve lever 24 however is normally held in its open position during the operation of the boiler by means of the action of the solenoid 27 upon the plunger 28, the plunger 28 being connected at its lower end to the lever 24. It will readily be seen that when the circuit through the solenoid is supplied with electrical energy so as to energize the solenoid, the plunger 28 will be drawn upwardly thus drawing the lever 24 of the valve 23 into open position against the tension of the spring 25.

For a purpose to be later described, there is also provided an alarm 29 illustrated diagrammatically in the lower right hand portion of Figure 1. This alarm 29, preferably of the electrically operated type, has one of its terminals connected by means of a conductor 30 to one pole of a source of electrical energy, and has its other terminal connected by means of a conductor 31 to a switch arm 32 pivoted at 33. The switch arm 32 is provided with a contact 34 adapted to make connection with a fixed contact 35 which is in turn connected by means of a conductor 36 to the opposite pole of the source of electrical energy. The pivoted switch arm 32 is normally urged toward closed position by means of the spring 37 secured to the arm 32 at one end and anchored at its other end 38. However, the solenoid 39 when energized by the passage of an electric current therethrough exerts a force upon the plunger 40 which is secured to the switch arm 32, which force acts in the opposite direction to the spring 37 and normally maintains the switch arm 32 in open position so long as the solenoid is energized.

For the purpose of controlling the circuits through the two solenoids 27 and 39, and hence for the purpose of controlling the fuel supply valve 23 and the alarm 29, the cylindrical wall 3 of the liquid level indicator is provided on one side thereof intermediate its ends with an electrode 41 secured through the wall 3 by means of a screw 42 passing through the wall of the cylindrical member and through an outer conductor bar 43 thus securing both conductor bars 41 and 43 in place on opposite sides of the wall 3 and forming an electrode passing through this wall. For the purpose of spacing the conductor bars 41 and 43 which are preferably of metal from the walls of the cylindrical member 3 so as to prevent them from injuring those walls, there are provided a pair of cushioning members 44 interposed between each of the conductor bars 41 and 43 and the cylindrical member 3.

Passing through the outer conductor bar 43 is a screw 45 secured in place by means of a nut 46 and forming a binding post adapted to receive an electrical conductor. The electrical conductor is secured in place on the binding post by means of the nut 47.

Hingedly secured to the inner conductor bar 41 is an arm 48 extending toward the opposite side of the chamber of the water level indicator and carrying at its free end a metallic float member 49. This metallic float member 49 is adapted to make contact with a conductor bar 50 secured to the opposite side of the cylindrical member 3 in substantially the same manner that the conductor 41 is secured thereto. As illustrated in Figure 1, this contact between the float member 49 and the conductor bar 50 is adapted to be closed when the float is raised by the presence of liquid within the liquid level indicator, and is adapted to be broken when the liquid level falls below a predetermined point.

As previously mentioned, the conductor bar 50 is secured to the cylindrical member 3 in the same manner as the conductor bar 41 thus providing on the outer wall of the cylindrical member a second binding post adapted to receive a second electrical conductor.

The hinged connection between the arm 48 and the conductor 41 is accomplished by means of a downward extension 51 on the conductor bar 41 this downward extension having an opening therethrough for the purpose of receiving an angularly disposed portion 52 of the arm 48.

Referring again to the circuit as diagrammatically illustrated in Figure 1, the solenoid 27 which controls the flow of fuel through the fuel line 22 has one of its terminals connected by means of a conductor 53 to one pole of a source of electrical energy. This source of electrical energy may as illustrated be the same as that to which the alarm 29 is connected. The other terminal of the solenoid 27 is connected by means of a conductor 54 to one of the binding posts on the liquid level indicator. The other binding post on this indicator is connected to one terminal of the solenoid 39 by means of a conductor 55, the other terminal of this solenoid being connected by means of a conductor 56 to the remaining pole of the source of electrical energy.

The operation of the device above set forth is as follows: During the normal operation of the boiler, the level of the liquid within the boiler is such as to maintain the float 49 in its uppermost position as indicated by dotted lines in Figure 1 so that it will form an electrical contact between the conductor bar 41 and the conductor bar 50 thus electrically interconnecting these two electrodes. When this state exists, the circuit will be closed through the solenoids 27 and 39 thus maintaining the valve 23 in its open position so as to allow fuel to pass through the boiler, and likewise so as to maintain the switch arm 32 in its open position and prevent the sounding of the alarm 29.

If, however, the liquid level within the liquid level indicator falls too low, the float 49 will be allowed to drop thus breaking the contact between the two conductor bars or electrodes 41 and 50 and breaking the circuit through the two solenoids 27 and 39. As soon as this takes place, the switch arm 24 is immediately pulled to its closed position by means of the spring 25 thus shutting off the supply of fuel to the boiler and thereby preventing any disastrous consequences resulting from the low liquid level. At the same time, the solenoid 39 being deenergized allows the switch arm 32 to be moved to closed position by means of the spring 37 thus closing the alarm circuit and causing the alarm 29 to sound.

It will be seen that even in the event that the source of electrical current should fail for any reason, no dangerous consequences could arise therefrom because of the fact that immediately upon the failure of the source of current the solenoids 27 and 39 will be deenergized and the flow of fuel would be automatically cut off. It will further be noted that since the cylindrical member 3 is of glass, it is not only transparent for the purpose of allowing visual inspection of the liquid level, but it is also a non-conductor or an insulator serving to electrically insulate the two electrodes 41 and 50 from each other. It will be noted furthermore that the presence of water will not serve to interconnect these electrodes at a time when they should not be connected because of the fact that when the water level is high enough to interconnect the electrodes, then the float will also be high enough to interconnect them and no harm will result. When, however, the water level falls and it is therefore proper for the electrodes to be disconnected from each other, the water level will be so low that it will not touch either electrode and hence will not form any electrical contact between them.

It will be seen from the above that means has been provided for carrying out all of the objects and advantages of this invention in a thoroughly practical and efficient manner. It is to be understood however that numerous changes and modifications may be made in the details of construction and arrangement of parts of this invention without departing from the spirit or scope thereof as set forth in the appended claims.

It is pointed out, for instance, that various types of valve and alarm mechanisms may be provided within the scope of the appended claims, such types of course being arranged to be controlled by the level of the liquid in the boiler.

What I claim is:

1. In a device of the character described, a liquid level indicator glass for a boiler, a pair of electrodes extending through the walls of said glass on substantially the same level on opposite sides of and adjacent the lower end of said chamber, each of said electrodes having a part outside of said chamber adapted to receive an electrical conductor, a valve for controlling a flow of fuel to said boiler, means continuously urging said valve to closed position to shut off the fuel supply, electrically actuated means for maintaining said controlling means in open position against the urging of said first mentioned means, an electric alarm circuit, a switch for said alarm circuit, closing means normally urging said switch to closed position to sound the alarm, a second electrically actuated means for maintaining said switch in open position against the urging of said closing means, a source of electricity connected to said alarm circuit to actuate the alarm when said switch is in closed position, means connecting said source of electricity in series with said first and second mentioned electrically actuated means and the electrodes on said indicator glass, and a float of electrically conductive material hinged to one of said electrodes within the indicator glass and adapted to swing upwardly into contact with the other of said electrodes when the liquid level in the indicator glass reaches a predetermined level, whereby when the indicator glass is filled to or past said predetermined level the circuit will be closed from said source of electricity through said first and second electrically actuated means to maintain said valve in open position and permit the flow of fuel to the boiler and to maintain said switch in open position and prevent the sounding of the alarm, and whereby when the indicator glass is not filled to said level said float will swing downwardly out of contact with the other electrode to open the circuit through said first and second electrically actuated means to permit said valve to be moved to closed position by the said means provided therefor and thus shut off the fuel supply to the boiler, and to permit said switch to be moved to closed position by said closing means, thus closing the alarm circuit and causing the alarm to sound.

2. In a device of the character described, a liquid level indicator glass for a boiler, a pair of electrodes extending through the walls of said glass on substantially the same level on opposite sides of and adjacent the lower end of said chamber, each of said electrodes having a part outside of said chamber adapted to receive an electrical conductor, a valve for controlling a flow of fuel to said boiler, means continuously urging said valve to closed position to shut off the fuel supply, electrically actuated means for maintaining said controlling means in open position against the urging of said first mentioned means, a source of electricity, means connecting said source of electricity in series with said electrically actuated means and the electrodes on said indicator glass, and a float of electrically conductive material hinged to one of said electrodes within the indicator glass and adapted to swing upwardly into contact with the other of said electrodes when the liquid level in the indicator glass reaches a predetermined level, whereby when the indicator glass is filled to or past said predetermined level the circuit will be closed from said source of electricity through said electrically actauted means to maintain said valve in open position and permit the flow of fuel to the boiler, and whereby when the indicator glass is not filled to said level said float will swing downwardly out of contact with the other electrode to open the circuit through said electrically actuated means to permit said valve to be moved to closed position by the said means provided therefor and thus shut off the fuel supply to the boiler.

3. In a boiler control device, a liquid level indicator for the boiler, a fuel supply valve for the boiler, means independent of any electrical supply for continuously urging said valve toward closed position, electrically actuated means for normally maintaining said valve in open position against the urging of said first mentioned means, a pair of spaced electrodes extending into said liquid level indicator adjacent its lower end, electrically conductive float operated means for electrically interconnecting said electrodes within the indicator when the liquid therein is at or above a predetermined level, a source of electrical energy, and means for connecting said electrically actuated means to said source of electrical energy in series with said electrodes, whereby when the liquid level in said indicator is sufficiently high, said electrically actuated means will be energized and the fuel valve maintained in open position to supply fuel to the boiler, and whereby when said liquid level falls below a predetermined point or said electrically actuated means is in any way disconnected from said source of electrical energy, the fuel supply valve will be closed to shut off the fuel supply to the boiler.

LAWRENCE W. SCOTT.